United States Patent [19]

Matsukawa

[11] Patent Number: 5,555,014
[45] Date of Patent: Sep. 10, 1996

[54] PRINTING APPARATUS

[75] Inventor: Koji Matsukawa, Nagoya, Japan

[73] Assignee: Brother Kogyo Kabushiki Kaisha, Nagoya, Japan

[21] Appl. No.: 191,080

[22] Filed: Feb. 4, 1994

[30] Foreign Application Priority Data

Apr. 14, 1993 [JP] Japan ................................. 5-112120

[51] Int. Cl.$^6$ .................................................. H04N 1/21
[52] U.S. Cl. ........................................ 347/262; 355/208
[58] Field of Search .................................. 347/237, 247, 347/262, 139; 358/448, 449, 451; 355/208

[56] References Cited

U.S. PATENT DOCUMENTS

| | | |
|---|---|---|
| 4,947,269 | 8/1990 | Yamada .................................. 358/448 |
| 5,222,157 | 6/1993 | Yoneda et al. ......................... 358/403 |

*Primary Examiner*—Mark J. Reinhart
*Attorney, Agent, or Firm*—Oliff & Berridge

[57] ABSTRACT

For a printing operation, it is judged whether a print-direction indicated sheet is stored in a longitudinal sheet cartridge or lateral sheet cartridge. If the indicated sheet is judged to be a sheet stored in the longitudinal sheet cartridge, the presence of a sheet in the longitudinal sheet cartridge is judged. If a sheet is judged to remain in the longitudinal sheet cartridge, the longitudinal sheet cartridge is selected and a second feeding control unit feeds a sheet to perform the printing operation in a print engine. On the other hand, if a sheet is judged not to remain, the sheet cartridge is switched to a lateral sheet cartridge and a sheet is fed by a first feeding control unit. In this switching operation, the print data is developed to meet the switched print direction in a data developing unit so that the same print-out result as obtained before the cartridge switching operation takes place is obtained after the cartridge switching operation. Accordingly, even when the properly oriented sheets are lacking in the course of the printing operation, the printing operation can be continued without being interrupted for the addition of properly oriented sheets if the same size sheets remain in another sheet cartridge that can supply sheets having a different orientation with respect to the feeding direction.

18 Claims, 5 Drawing Sheets

FIRST DEVELOPMENT PROCESSING

FEEDING DIRECTION

SECOND DEVELOPMENT PROCESSING

FEEDING DIRECTION

FIRST DEVELOPMENT PROCESSING

FEEDING DIRECTION

SECOND DEVELOPMENT PROCESSING

FEEDING DIRECTION

PRINTING APPARATUS

BACKGROUND OF THE INVENTION

1. Field of the Invention

This invention relates to a printing apparatus capable of conducting a printing operation on the same size sheets which are supplied in either a longitudinal direction or in a lateral direction.

2. Description of Related Art

There has been conventionally known a printing apparatus in which the printing operation can be conducted on the same size sheets in both of the longitudinal and lateral directions. In the following description, the "longitudinal direction" for the printing operation does not correspond to the longitudinal direction of the sheet itself, but means that a sheet is supplied from a sheet cartridge to a printing unit in a direction which is parallel to the longitudinal direction of the sheet itself (the direction vertical to the shorter edges of the sheet, and parallel to the longer edges of the sheet), and the printing operation is carried out from the top line of the fed sheet at one shorter edge side of the sheet to the bottom line of the sheet at the other shorter edge side of the sheet. On the other hand, the "lateral direction" for the printing operation means that a sheet is supplied from a sheet cartridge to a printing unit in a direction which is transverse to the longitudinal direction of the sheet itself (the direction vertical to the longer edges of the sheet, and parallel to the shorter edges of the sheet), and the printing operation is carried out from the top line of the fed sheet at one longer edge side of the sheet to the bottom line of the sheet at the other longer edge side of the sheet.

For example, in order to print characters such as letters, symbols, images, etc. on an A-4 size sheet so that the character rows (lines) are directed in the longitudinal and lateral directions of the A4-size sheets (these print directions on the sheet and sheets on which the characters are printed in these print directions are hereinafter referred to as "longitudinal and lateral print directions" and "longitudinal and lateral sheets", respectively), such a printing device is so designed that two types of sheet cartridges, that is, a cartridge for A4-size longitudinal sheets (hereinafter referred to as "longitudinal sheet cartridge") and a cartridge for A4-size lateral sheets (lateral sheet cartridge) are detachably installed into the printing device. In this case, when a printing operation for sheets supplied in the longitudinal direction from the sheet cartridge is instructed, the sheets are supplied from the longitudinal sheet cartridge for A4-size sheets and then the printing operation is carried out. On the other hand, when a printing operation for sheets supplied in the lateral direction from the sheet cartridge is instructed, the sheets are supplied from the lateral sheet cartridge for A4-size sheets and then the printing operation is carried out.

In the apparatus capable of printing on sheets in the longitudinal and lateral directions as described above, when all sheets in the A4-size longitudinal sheet cartridge are used (that is, no sheet remains in the longitudinal sheet cartridge) during the printing operation for the sheets supplied from the A4-size longitudinal sheet cartridge, the subsequent printing operation cannot be conducted even when A4-size sheets having the same size remain in the lateral sheet cartridge. Therefore, the printing operation ceases, and sheets must be added to the empty A4-size longitudinal sheet cartridge to resume the printing operation.

SUMMARY OF THE INVENTION

An object of this invention is to provide a printing apparatus in which even when sheets are used up in one sheet cartridge, a printing operation can be continued without supplementing sheets if any sheet remains in the other sheet cartridge.

In order to attain the above object, the printing apparatus according to the invention which includes a longitudinal sheet storing device for storing sheets to supply the sheets in the longitudinal direction, a lateral sheet storing device for storing the same-size sheets as the sheets stored in the longitudinal sheet storing device to supply the sheets in the lateral direction, and a sheet feeding mechanism for feeding to a printing unit a sheet which is stored in either one of the longitudinal sheet storing device and the lateral sheet storing device, the sheet fed from the sheet feeding mechanism being subjected to the printing operation in the printing unit, includes sheet direction judging means for making an judgment (identification) as to the sheet storing device (identification of one of the longitudinal and lateral sheet storing devices) in which a print-direction indicated sheet (that is, a sheet for which the print-direction is currently indicated) is stored, sheet presence judging means for judging the presence or absence of any sheets in the longitudinal or lateral sheet storing devices which is identified as storing the print-direction indicated sheet by the sheet-direction judging means, sheet storing device selecting means for selecting a one of the longitudinal sheet storing device and the lateral sheet storing device which stores the print-direction indicated sheet when the presence of any sheet is judged by the sheet presence judging means and making the sheet feeding mechanism to carry out a feeding operation, sheet storing device switching means for switching the selected sheet storing device to the other storing device (the longitudinal sheet storing device or the lateral sheet storing device) storing sheets whose print direction is different from that of the print-direction indicated sheet when the absence of any sheet is judged by the sheet presence judging means and making the sheet feeding mechanism carry out the feeding operation, and print data developing means for developing print data in accordance with a switched print-direction when the longitudinal sheet storing device or the lateral sheet storing device is switched to the other storing device by the sheet storing device switching means.

According to the printing apparatus of the invention thus structured, when print data is transmitted from a host computer and the printing operation is carried out on the basis of the print data, the sheet direction judging means judges whether a sheet whose print direction is indicated is stored in the longitudinal sheet storing device or lateral sheet storing device, and the sheet presence judging means judges the presence or absence of any sheet for the longitudinal or lateral sheet storing device which is identified as storing the print-direction indicated sheet by the sheet direction judging means. When the sheet presence judging means judges that a sheet remains in the identified sheet storing device, the sheet storing device selecting means selects the appropriate one of the longitudinal and lateral sheet storing devices, which stores the print-direction indicated sheet, and makes the sheet feeding mechanism feed the sheet to the printing unit for the printing operation. On the other hand, when the sheet presence judging means judges that no sheet remains in the identified sheet storing device, or that all sheets have been used up in the identified sheet storing device in the course of the printing operation, the sheet storing device switching means switches the selected sheet storing device to the other storing device (the longitudinal sheet storing device or the lateral sheet storing device) storing sheets whose print direction is different from that of the print-direction indicated sheet and makes the sheet feeding mechanism carry out the feeding operation. The print data developing means develops print data in accordance with a switched print-direction. Through this operation, the printing operation can be continued even when the sheet storing device for supplying the sheets is switched to another storing device as described above.

As described above, even when no appropriate print-direction sheet exists in the sheet storing device, or all the print-direction indicated sheets have been used up in the sheet storing device in the course of the printing operation, the printing operation can be continued by using the same size sheets whose print direction is different from that of the print-direction indicated sheets.

As is apparent from the foregoing, according to the printing apparatus of this invention, even when all sheets are used up in a sheet storing cartridge in the course of a printing operation, the printing operation can be continued without pause and without adding new sheets if any sheet having the same size exists in another sheet cartridge for different print-direction sheets.

BRIEF DESCRIPTION OF THE DRAWINGS

A preferred embodiment of the invention will be described in detail with reference to the following figures wherein.

DETAILED DESCRIPTION OF THE PREFERRED EMBODIMENTS

A printer of an embodiment in which a printing apparatus of the invention is embodied will be hereunder described with reference to the accompanying drawings.

Figure 1:
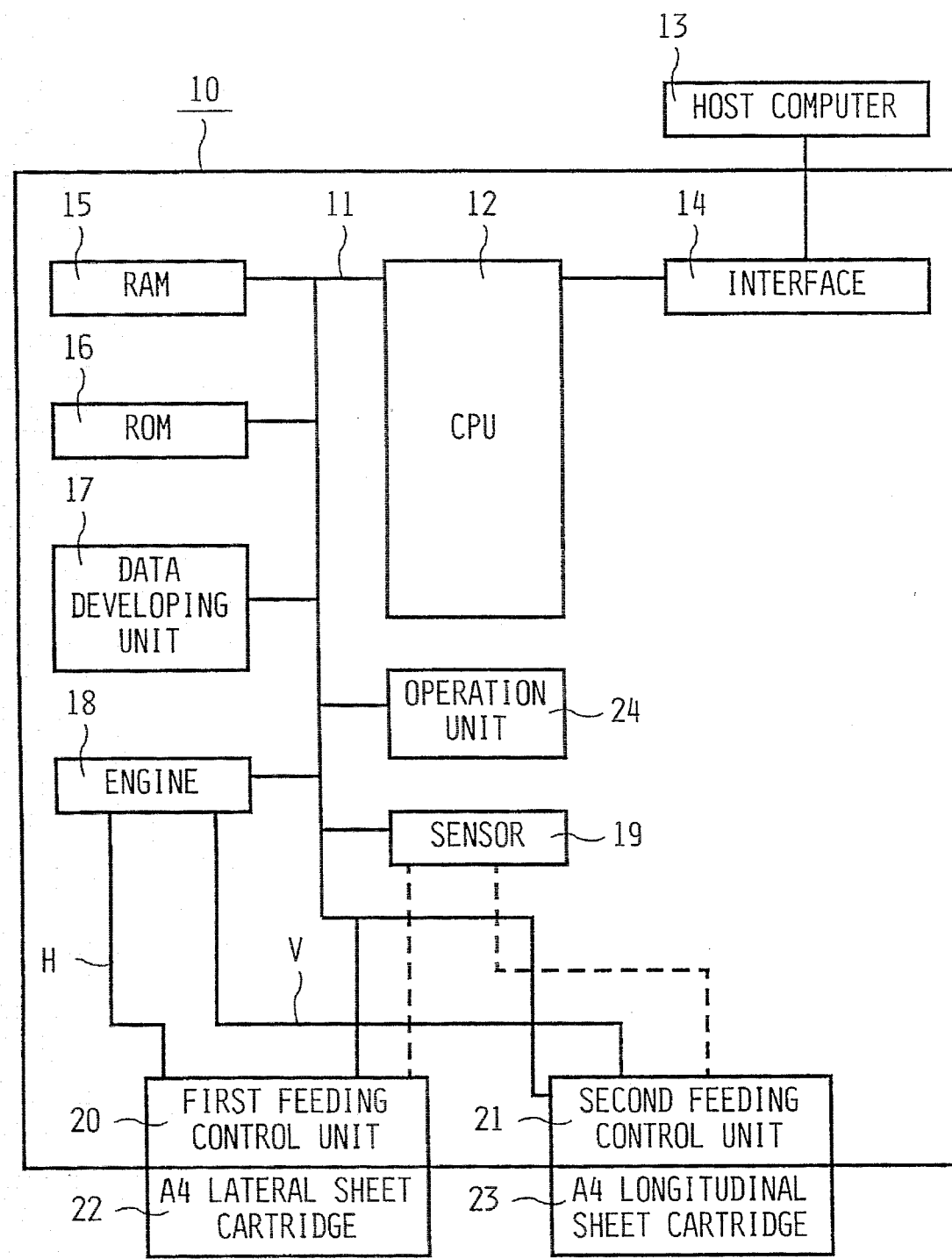
FIG. 1 is a block diagram showing a laser printer of an embodiment according to the invention.

The laser printer 10, shown in FIG. 1, is connected to a host computer 13 and carries out a printing operation on the basis of print data transmitted from the host computer 13. The laser printer 10 is so designed that the print data transmitted from the host computer 13 is received through an interface 14 and the received print data is subjected to a print processing by a CPU 12.

The CPU 12 is connected through a bus line 11 to a RAM 15 for temporarily holding the print data and other working data; a ROM 16 for holding font data, control information for sheet feeding (as described later), and other control programs; a data developing unit 17 for converting the print data to image data; an engine 18 for enabling a printing operation for A4-size sheets supplied in a longitudinal direction (hereinafter referred to as "longitudinal A4 sheets"), A4-size sheets supplied in a lateral direction (hereinafter referred to as "lateral A4 sheets"), and A3-size sheets supplied in the longitudinal direction (hereinafter referred to as "longitudinal A3 sheets"); a first feeding control unit 20 for feeding the A4-size sheets in the lateral direction or for feeding A3-size sheets in the longitudinal direction to the engine 18. The longitudinal-direction width (the width of the sheet in terms of the longitudinal direction for the printing operation) of the A3-size sheets is equal to the lateral-direction width of the A4-size sheets; a second feeding control unit 21 for feeding the A4-size sheets to the engine 18 in the longitudinal direction; a sensor 19 for detecting a residual sheet amount; and an operation unit 24 for switching the operation of the laser printer 10.

The first feeding control unit 20 is so designed as to be potentially loadable with two types of sheet cartridges, that is, an A4-size lateral sheet cartridge for supplying A4-size sheets in the lateral direction and an A3-size sheet cartridge for supplying A3-size sheets in the longitudinal direction. In this case, the A4-size sheet cartridge 22 is loaded into the first feeding control unit 20. On the other hand, an A4-size longitudinal sheet cartridge 23 for supplying A4-size sheets in the longitudinal direction is loaded into the second feeding control unit 21. Further, the first feeding control unit 20 is so designed as to feed the A3-size sheets stored in the A3 longitudinal sheet cartridge in the longitudinal direction or the A4-size sheets stored in the A4 lateral sheet cartridge 22 in the lateral direction through a feeding passage H to the engine 18. Likewise, the second feeding control unit 21 is so designed as to feed the A4-size sheets stored in the A4 longitudinal sheet cartridge 23 in the longitudinal direction through a feeding passage V to the engine 18.

Figure 4A:
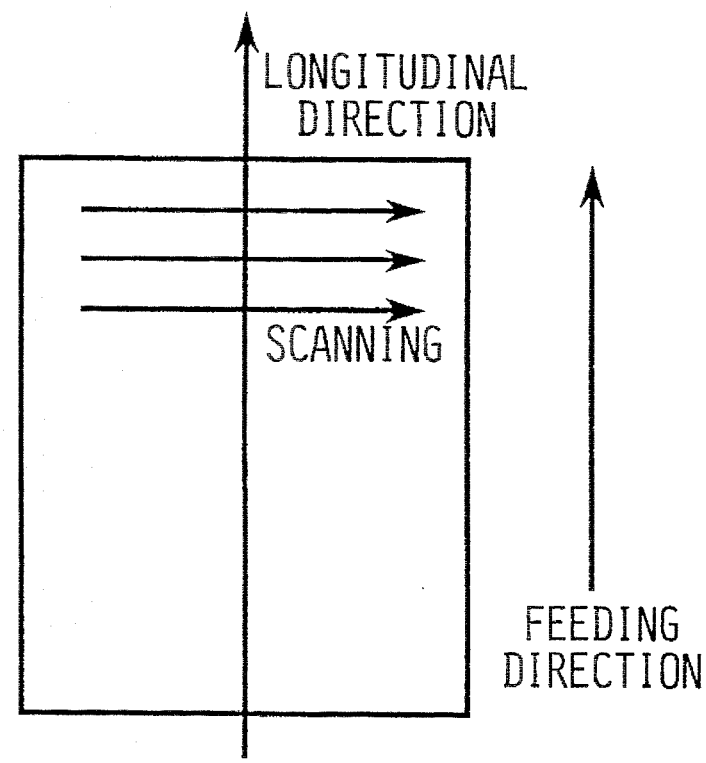
FIGS. 4A and 4B are schematic views showing a scanning direction with respect to a sheet.
Figure 4B:
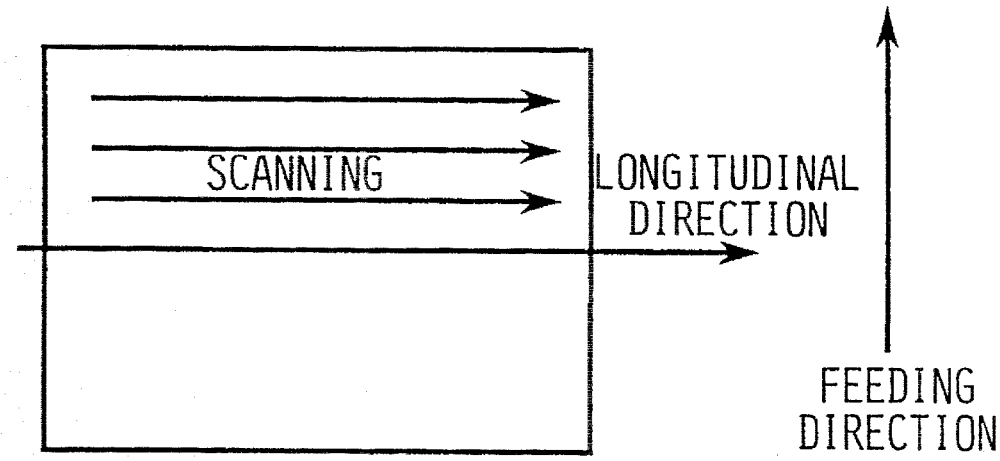

On the basis of image data developed in a data developing unit 17, the engine 18 scans a laser beam in a main scanning direction which is vertical to the sheet feeding direction. That is, as shown in FIGS. 4A and 4B, the laser scanning is carried out in the direction vertical to the longitudinal direction of the sheet itself when an A3-size sheet or A4-size sheet is fed in the longitudinal direction and in the direction parallel to the longitudinal direction of the sheet itself when an A4-size sheet is fed in the lateral direction, thereby carrying out the printing operation.

The data developing unit 17 is so designed as to carry out a switching operation between two types of development processing for the print data and uses the appropriate switched (selected) development processing. The first development processing for the print data is used for the printing of characters arranged in a direction transverse to the sheet feeding direction on the basis of the instruction of the print data, and the second development processing for the print data is used for the printing of characters arranged in parallel to the sheet feeding direction.

Figure 5A:
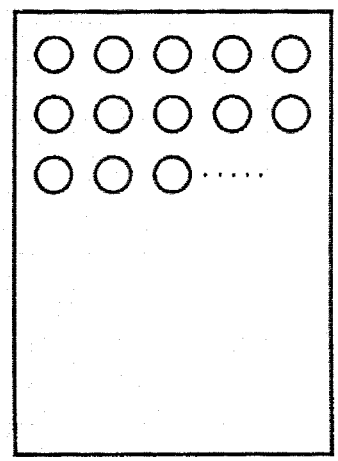
FIGS. 5A to 5D are schematic views showing a development processing for the sheet.
Figure 5B:
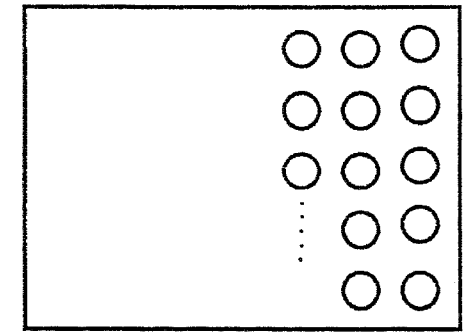

For the second development processing, the matrix of the print data is rotated by 90° to perform the development of the image data. Accordingly, in a case where the printing operation is carried out on the basis of the image data which has been subjected to the first development processing in the data developing unit 17, for example, A4 lateral printing is carried out like the printing style of this specification, as shown in FIG. 5A. An A4-size sheet stored in the A4 longitudinal sheet cartridge 23 is fed in the longitudinal direction, and the sheet is scanned with laser beam in the direction transverse to the sheet feeding direction in the engine 18 to print characters arranged in the direction transverse to the sheet feeding direction. The same printing operation is carried out for a sheet supplied in the lateral direction according to the second development processing in the data developing unit 17. That is, as shown in FIG. 5B, an A4-size sheet stored in the A4 lateral sheet cartridge 22 is fed in the lateral direction, and the sheet is scanned with the laser beam in the direction transverse to the sheet feeding direction (in the lateral direction of the sheet itself) although the resultant printed characters are arranged in parallel to the sheet feeding direction.

Figure 5C:
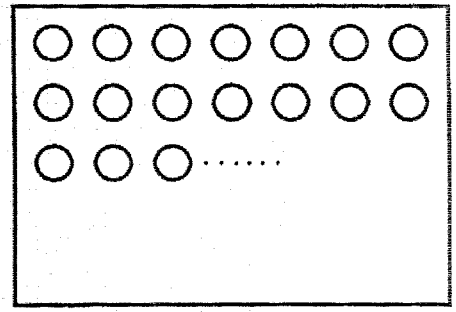
Figure 5D:
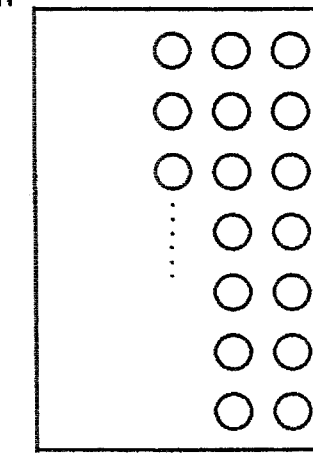

Likewise, the same print-out result which is obtained by feeding a sheet stored in the A4 lateral sheet cartridge 22 in the lateral direction and printing characters arranged in the direction transverse to the sheet feeding direction on the basis of the first development processing, as shown in FIG. 5C, can be obtained by feeding an A4-size sheet stored in the A4 longitudinal sheet cartridge 23 to the engine 18 in the longitudinal direction and printing the characters in accordance with the second development processing.

The sensor 19 serves to judge whether the cartridges loaded into the first feeding control unit 20 and the second feeding control unit 21, that is the cartridges for storing A3-size longitudinal sheets, A4-size lateral sheets or A4-size longitudinal sheets are loaded and to detect the amount of sheets stored in each of the loaded cartridges.

Figure 2:
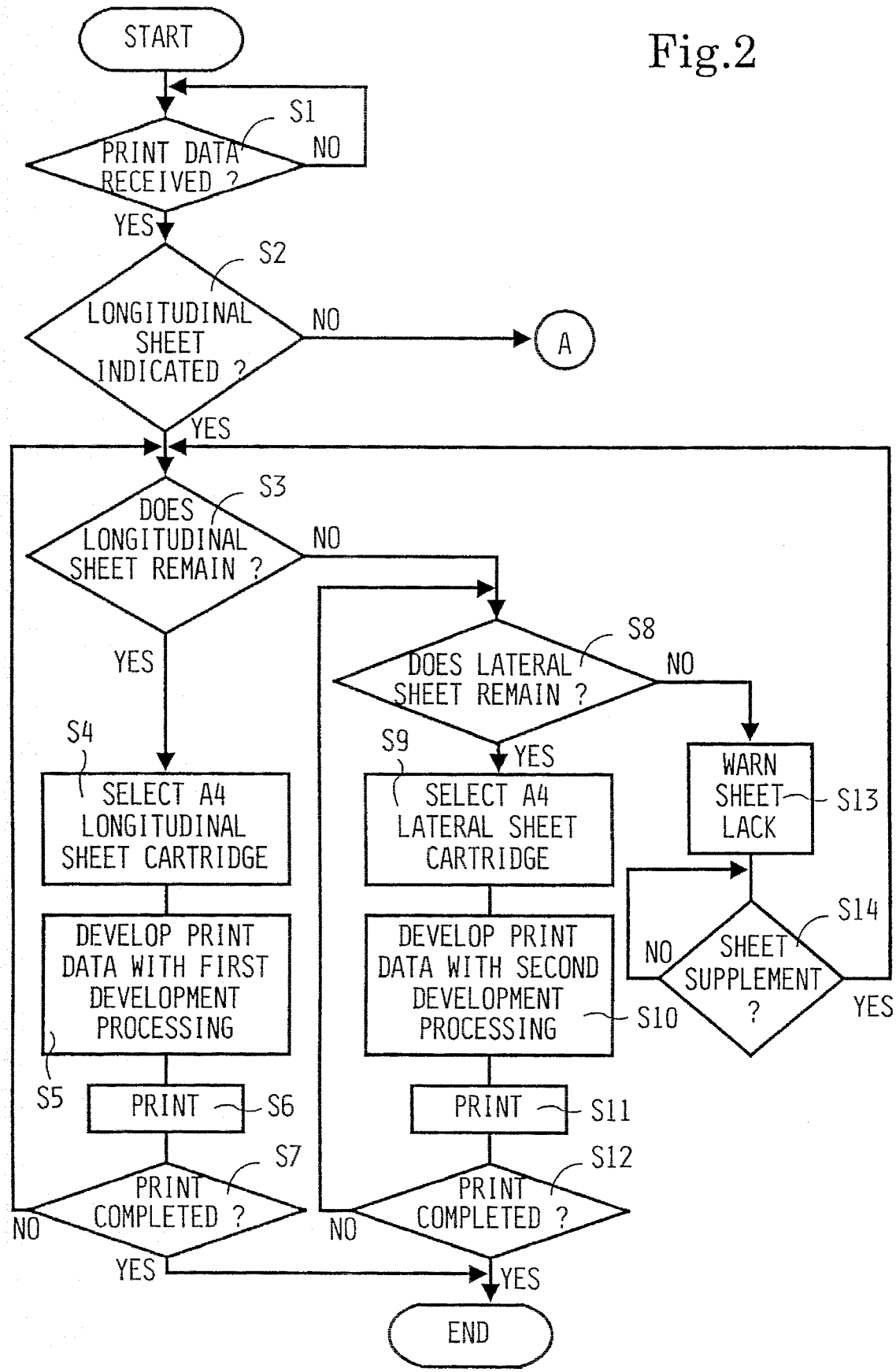
FIG. 2 is a flowchart for the processing of the laser printer as shown in FIG. 1.
Figure 3:
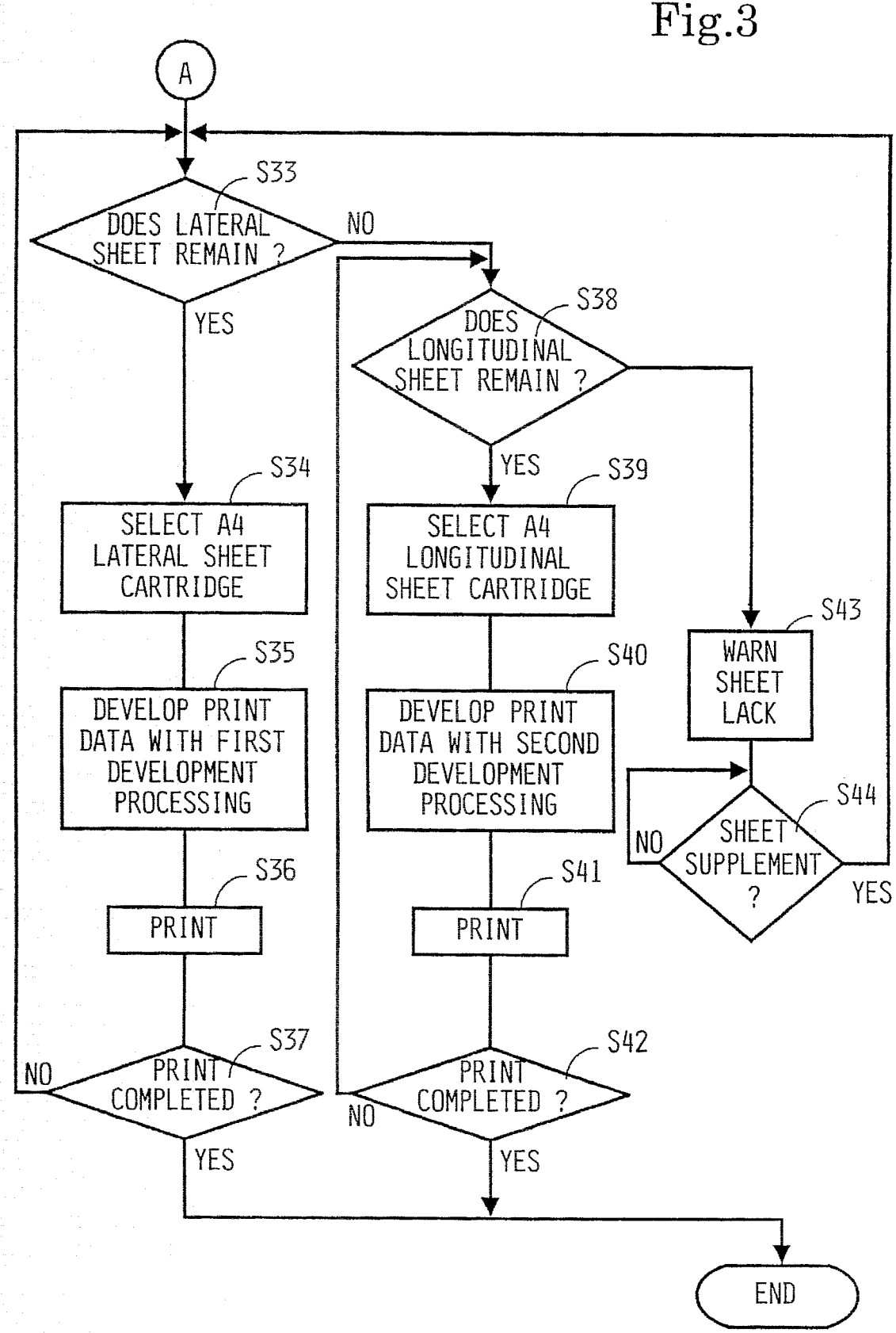
FIG. 3 is another flowchart for the processing of the laser printer as shown in FIG. 1.

Next, the print processing by the laser printer 10 when the A4 lateral sheet cartridge 22 and the A4 longitudinal sheet cartridge 23, as shown in FIG. 1, are loaded in the laser printer 10 will be described with reference to the flowcharts of FIGS. 2 and 3.

Upon receiving the print data from the host computer 13 (step S1: Yes), the CPU 12 of the laser printer 10 first judges whether a printing operation for longitudinally-supplied sheets is instructed in the print data (judgment step S2). When the printing operation is for the longitudinally-supplied sheets, like the A4 lateral printing for the printing style of this specification, the judgment step S2 has a positive judgment "Yes". Subsequently it is judged, on the basis of the output of the sensor 19, whether any sheets remain in the A4 longitudinal sheet cartridge 23 (judgement step S3). In this case, if any sheets are judged to remain in the A4 longitudinal sheet cartridge 23 (judgement step S3: Yes), the program goes to the processing of step S4. At the step S4, the CPU 12 selects the A4 longitudinal sheet cartridge 23 and transmits a sheet feeding instruction to the second feeding control unit 21 to feed a sheet stored in the A4 longitudinal sheet cartridge 23 through the feeding passage V to the engine 18. Subsequently, at step S5, the first development processing is carried out, for the printing of the longitudinally-supplied sheet in the data developing unit 17, to prepare the image data.

At a step S6, the image data which has been developed in the data developing unit 17 is transmitted to the engine 18, and the laser scanning is carried out for the sheet which is fed in the longitudinal direction by the second feeding control unit 21, thereby performing the printing operation. Upon completion of the printing of the sheet, it is judged at a next judgment step S7 whether the print processing is completed for all the print data. If the print processing for all the print data is completed (judgment step S7: Yes), the processing is ended. On the other hand, if the print processing is judged not to be completed (judgment step S7: No), the program returns to the step S3 to start the print processing for the next sheet.

At the judgment step S3, it is judged again, on the basis of the output of the sensor 19, whether any sheets remain in the A4 longitudinal sheet cartridge 23. If a sheet remains in the A4 longitudinal sheet cartridge 23 (judgment step S3: Yes), the program goes to the step S4 to carry out the processing from the step S4 to the step S7. On the other hand, if no sheets remain in the A4 longitudinal sheet cartridge 23 (judgment step S3: No), the program goes to Judgment step S8.

At the judgment step S8, it is judged, on the basis of the output of the sensor 19, whether any sheets remain in the A4 lateral sheet cartridge 22. If no sheets remain in the A4 lateral sheet cartridge 22 (judgment step S8: No), the program goes to step S13 to warn the user of the lack of sheets and to wait for the addition, or supplementing, of A4-size sheets to either of the cartridges 22,23. When sheets are added to either of the cartridges 22,23 (judgment step S14: Yes), the program returns to the step S3 to resume the print processing.

On the other hand, if any sheets remain in the A4 lateral sheet cartridge 22 (judgment step S8: Yes), the program goes to a step S9. At the step S9, the CPU 12 selects the A4 lateral sheet cartridge 22, and transmits a feeding instruction to the first feeding control unit 20 to feed a sheet stored in the A4 lateral sheet cartridge through the feeding passage H to the engine 18. At a step S10, the second development processing as described above is carried out for the laterally-supplied sheet to obtain the same print-out result as for the longitudinally-supplied sheet, that is, the image data development is performed with rotation of the matrix of the print data by 90°. At a step S11, the image data which has been developed in the data developing unit 17 is transmitted to the engine 18 and the laterally-supplied sheet is scanned with the laser beam to perform the printing operation. Upon completion of the printing operation of the sheet, it is judged at a next judgment step S12 whether the print processing for all the print data is completed. If the print processing for all the print data is judged to be completed (judgment 12: Yes), the processing is ended. On the other hand, if the print processing is judged not to be completed (judgment step S12: No), the program returns to the judgment step S8 to resume the print processing for a next sheet.

On the other hand, if the printing for the laterally-supplied sheet is instructed in the print data at the judgment step S2 as described above, the judgment step S2 becomes a negative Judgment "No". The processing in this case will be described with reference to the flowchart of FIG. 3.

First, it is judged on the basis of the output of the sensor 19 whether any sheets remain in the A4 lateral sheet cartridge 22 (judgment step S33). In this case, if any sheets are judged to remain in the A4 lateral sheet cartridge 23 (judgment step S33: Yes), the program goes to a processing of step S34. At the step S34, the CPU 12 selects the A4 lateral sheet cartridge 22 and transmits a feeding instruction to the first feeding control unit 20 to feed a sheet stored in the A4 lateral sheet cartridge 22 through the feeding passage H to the engine 18. At a step S35, the first development processing, as described above, is carried out for the printing of the laterally-supplied sheet to prepare an image data. At a step S36, the image data which has been developed in the data developing unit 17 is transmitted to the engine 18 and the laser beam is swept over the sheet which is fed in the lateral direction by the first feeding control unit 20, thereby performing the printing operation. Upon completion of the printing operation of the sheet, it is judged at a next judgment step S37 whether the print processing for all the print data is completed. If the print processing for all the print data is judged to be completed, the processing is ended. On the other hand, if the print processing is judged not to be completed, the program returns to the judgment step S33.

At the judgment step S33, it is judged again, on the basis of the output of the sensor 19, whether any sheets remain in the A4 lateral sheet cartridge 22. If any sheets remain in the A4 lateral sheet cartridge 22, the program carries out the processing from the step S34 to the step S37. On the other hand, if no sheets remain in the A4 lateral sheet cartridge 22, the program goes to step S38. At judgment step S38, it is judged, on the basis of the output of the sensor 19, whether any sheets remain in the A4 longitudinal sheet cartridge 23. If no sheets remain in the A4 longitudinal sheet cartridge 23, the program goes to step S43 to warn the user of the lack of the sheets and wait for the addition, or supplementing, of sheets to either of the cartridges 22,23. If sheets are added into either of the cartridges 22,23 (judgment step S44: Yes), the program returns to step S33 to resume the printing operation.

On the other hand, if a sheet remains in the A4 longitudinal sheet cartridge 23, the program goes to a step S39. At the step S39, the CPU 12 selects the A4 longitudinal sheet cartridge 23, and transmits the sheet feeding instruction to the second feeding control unit 21 to feed a sheet stored in the A4 longitudinal sheet cartridge 23 through the feeding passage V to the engine 18. At a step S40, the second development processing, as described above, is carried out in the data developing unit 17 to obtain the same print-out result as for the laterally-fed sheet as described above and the image data development is performed with rotation of the matrix of the print data by 90°. At a step S41, the image data is transmitted to the engine 18, and the longitudinally-fed sheet is scanned with the laser beam to perform the printing operation. Upon completion of the printing operation of the sheet, it is judged at a next judgment step S42 whether the print processing for all the print data is completed. If the print processing for all the print data is judged to be completed (judgment step S42: Yes), the processing is ended.

According to the embodiment of this invention, as described above, in the laser printer 10 in which the same size sheets are supplied in the longitudinal and lateral directions for the printing operation, even when no sheet remains in one of the cartridges for storing the sheets in one orientation in the course of the printing operation, the sheet selection is automatically switched to the other cartridge for storing the sheets in the other orientation, so that the printing operation can be continued without being interrupted for the addition, or supplementing, of sheets.

Further, in this embodiment, when one sheet cartridge lacks the sheets and thus the currently-used cartridge is switched to the other sheet cartridge to supply sheets from the other sheet cartridge, the empty cartridge can be detached from the printing apparatus for the addition of sheets without interrupting the printing operation (i.e., while continuing the printing operation).

In the embodiment as described above, the sheet (sheet cartridge) is automatically selected on the basis of the print data transmitted from the host computer 13. However, in the printing apparatus of this invention, any of the cartridges may be selected to supply the desired sheets through the operation unit 24. Accordingly, if the A4 lateral sheet cartridge 22 is selected, the sheets can be supplied from the A4 lateral sheet cartridge 22 in the lateral direction (the width of the sheet in the sheet feeding direction is narrowest) for the printing operation irrespective of the instruction of the print data at all times. This provides a higher printing speed than the case where the sheets are supplied from the A4 longitudinal sheet cartridge 23 in the longitudinal direction for the printing operation because the direction of feed parallels the shortest axis of the sheet.

In the above embodiment, the A4 sheets are supplied in the longitudinal and lateral directions. However, the sheet size of this invention is not limited to A4 and is applicable to sizes other than A4. Further, in the description, a laser printer 10 is used as the printing apparatus, however, this invention is applicable to other printing apparatuses such as copying machines, facsimiles and dot matrix and ink jet printers for example.

What is claimed is:

1. A printing apparatus including a longitudinal sheet storing device for storing sheets to be supplied in a longitudinal direction, a lateral sheet storing device for storing the same size sheets as the sheets stored in the longitudinal sheet storing device, to supply the same size sheets in a lateral direction, and a sheet feeding mechanism for feeding to a printing unit a sheet which is stored in either one of the longitudinal sheet storing device and the lateral sheet storing device, the sheet fed from the sheet feeding mechanism being subjected to the printing operation in the printing unit, the printing apparatus further comprising:

sheet direction judging means for making a judgment as to whether a print-direction indicated sheet is stored in one of said longitudinal sheet storing device and said lateral sheet storing device;

sheet presence judging means for judging the presence of a sheet in said one of said longitudinal and lateral sheet storing devices which is identified as storing the print-direction indicated sheet by said sheet-direction judging means;

sheet storing device selecting means for selecting said one of said longitudinal sheet storing device and said lateral sheet storing device which stores the print-direction indicated sheet when the presence of any sheet is judged by said sheet presence judging means and making said sheet feeding mechanism carry out a feeding operation;

sheet storing device switching means for switching the selected sheet storing device to the other storing device which stores sheets whose print direction is different from that of the print-direction indicated sheet when the absence of any sheet is judged by said sheet presence judging means and making said sheet feeding mechanism carry out the feeding operation; and print data developing means for developing print data to meet the switched print direction when said one of said longitudinal sheet storing device and said lateral sheet storing device is switched to the other storing device by said sheet storing device switching means.

2. A printing apparatus, comprising:

a frame;

a print engine mounted in said frame;

a first feed unit mounted in said frame;

a second feed unit mounted in said frame;

a first sheet cartridge removably mounted in said frame for holding print sheets of a specified size such that a longitudinal axis of the print sheets is parallel to a printing feed direction;

a second sheet cartridge removably mounted in said frame for holding print sheets of the specified size such that the longitudinal axis of the print sheets is transverse to the printing feed direction; and control means for controlling printing on said print sheets, said control means directing said first feed unit or said second feed unit to feed print sheets from said first sheet cartridge or said second sheet cartridge, respectively, based upon an initial orientation of a matrix of print data and wherein said control means continues printing from the other of said first and second sheet cartridges when the print sheets are exhausted from an originally selected sheet cartridge by rotating the matrix of print data by 90° to correspond to an orientation of the paper sheets in the other sheet cartridge.

3. The printing apparatus as claimed in claim 2, further comprising sensor means for determining paper sheet status in said first and second sheet cartridges.

4. The printing apparatus as claimed in claim 3, wherein said control means comprises:

- print determination means for determining the initial orientation of the matrix of print data;
- print development means for developing print data based upon orientation of the print data;
- selection means for directing activation of a one of said first and second feed units based upon the orientation of the matrix of print data; and
- print control means for controlling said print engine to print the matrix of print data.

5. A method of printing, using a printing apparatus that feeds same sized paper sheets from either one of two sheet cartridges, a first sheet cartridge holding the paper sheets with their longitudinal axis parallel to a paper feed direction and a second sheet cartridge holding the paper sheets with their longitudinal axis transverse to the paper feed direction, comprising the steps of:

- receiving print data from a source;
- determining an orientation for printing of the print data;
- identifying whether any print sheets remain in a sheet cartridge appropriate to the orientation of the print data;
- preparing the print data for printing using a development process; and
- printing the print data, wherein when print sheets remain in the sheet cartridge appropriate to the orientation of the print data, the print data is prepared using a first development process, and when no sheets remain in the sheet cartridge appropriate to the orientation of the print data, the method further comprises the step of selecting the other of the two sheet cartridges and the print data is prepared using a second development process different from the first development process.

6. The method as claimed in claim 5, wherein said second development process includes the step of rotating an orientation of a print matrix of the print data by 90°.

7. The method as claimed in claim 5, further comprising the step of warning an operator when either one of the two sheet cartridges is out of the paper sheets.

8. The printing apparatus as claimed in claim 1, wherein the longitudinal axis of the sheets stored in said longitudinal sheet storing device is parallel to a feeding direction by said sheet feeding mechanism.

9. The printing apparatus as claimed in claim 1, wherein the longitudinal axis of the sheets stored in said lateral sheet storing device is transverse to a feeding direction by said sheet feeding mechanism.

10. The printing apparatus as claimed in claim 1, wherein said print data developing means develops print data by rotating a matrix of print data to meet the switched print direction.

11. The printing apparatus as claimed in claim 10, wherein an angle of rotation by said print data developing means is 90°.

12. The printing apparatus as claimed in claim 11, wherein said print data developing means develops print data in parallel to a feeding direction by said sheet feeding mechanism.

13. The printing apparatus as claimed in claim 1, wherein said sheet storing device switching means switches said longitudinal sheet storing device to said lateral sheet storing device when the absence of the sheets stored in said longitudinal sheet storing device is judged by said sheet presence judging means.

14. The printing apparatus as claimed in claim 1, wherein said sheet storing device switching means switches said lateral sheet storing device to said longitudinal sheet storing device when the absence of the sheets stored in said lateral sheet storing device is judged by said sheet presence judging means.

15. The printing apparatus as claimed in claim 13, wherein said print data developing means develops print data on the sheets stored in said lateral sheet storing device transverse to the longitudinal axis of the sheets.

16. The printing apparatus as claimed in claim 14, wherein said print data developing means develops print data on the sheets stored in said longitudinal sheet storing device parallel to the longitudinal axis of the sheets.

17. The printing apparatus as claimed in claim 1, wherein said sheet presence judging means includes a sensor for detecting the presence of the sheet.

18. The printing apparatus as claimed in claim 1, further comprising warning means for warning an operator when either one of said longitudinal and lateral sheet storing devices is out of sheets.

* * * * *